Patented Apr. 19, 1949

2,467,715

UNITED STATES PATENT OFFICE 2,467,715

MANUFACTURE OF ANIMAL GLUE JELLIES

Thomas Aubrey White, Jackson Heights, N. Y., assignor to National Starch Products, Inc., New York, N. Y., a corporation of Delaware No Drawing. Application March 8, 1946, Serial No. 653,122

7 Claims. (Cl. 106—126)

My invention relates to the manufacture of glue jellies and particularly to animal glue jellies and has special reference to the type of plasticized animal glue adhesives known commercially as flexible glues.

It is well known that the presence of reducing sugars such as corn or invert sugars in animal glue adhesives results in what is herein referred to as a resinification reaction, indicated by a progressive increase in viscosity and a tough, rubbery texture, eventually reaching a point where the adhesive becomes unusable. This resinification reaction is greatly accelerated by heat. Flexible glues are made by heating animal glue, water, and plasticizer to a homogeneous dispersion, and allowing the material to cool in molds so as to form semi-rigid slabs. In order to use the glue it must again be melted down by heat (with or without addition of water) so as to regain its fluid form. The resinification reaction, accelerated by the heat, may thicken and rubberize the composition during its manufacture. Or, it may continue, over a longer period of time, in the slabs, resulting in the eventual insolubilization of the glue cake, that is, it can no longer be caused to revert to the fluid, usable form. On the other hand, if the glue cake is melted down before the animal glue-reducing sugar resinification reaction has insolubilized it, the reaction nevertheless continues at an accelerated rate in the heated liquid adhesive, so that in a relatively short time it is converted into a thick, rubbery, unusable mass.

Because of the above reaction, it has not heretofore been feasible to use reducing sugars as the plasticizing media in flexible glues, even though it would otherwise be commercially advantageous to use reducing sugars such as corn sugar in place of cane sugar, since corn sugar is considerably less expensive than cane sugar under ordinary market conditions.

The prime object of my present invention is to restrain the resinification of animal glues in the presence of reducing sugars, and thus to make possible the use of reducing sugars as the plasticizing media in animal glue compositions, such as flexible glues. This object is attained by adding to animal glue compositions a resinification inhibitor.

I have found that the addition of any chemical compound containing the ammonium radical restrains the animal glue-reducing sugar resinification reaction and thus acts as the resinification inhibitor. Regardless of the other radical or radicals in the particular ammonium compound chosen, it is the ammonium radical itself which functions as the resinification inhibitor. Thus, suitable resinification inhibitors would include ammonium sulphate, ammonium phosphate, ammonium acetate, ammonium chloride, ammonium nitrate, ammonium thiocyanate, as well as the other known compounds containing the ammonium radical. A preferred inhibitor is ammonium sulphate because it is relatively inexpensive and readily available.

In selecting a particular ammonium compound, the effect that the portion of the compound other than the ammonium radical may have on the glue composition should also be considered. Thus, for example, it is well known that chlorides, nitrates and thiocyanates tend to thin or liquify animal glues, and, therefore, in manufacturing a flexible glue composition where a semi-rigid slab is the desired final product, other resinification inhibitors than ammonium nitrate or ammonium chloride or ammonium thiocyanate should be selected. On the other hand, in certain liquid animal glue compositions these salts would be entirely suitable. In any case, the ammonium radical serves to retard resinification between the reducing sugar and the animal glue, regardless of any additional effect brought about by the remainder of the ammonium compound.

The amount of ammonium compound to be added depends upon several variables, such as the particular type of ammonium chemical used and the amount of reducing sugar present. The resinification restraining effect is noticeable even with the use of only a fraction of one per cent of the ammonium compound. However, for average animal glue compositions, using ammonium sulphate, I prefer to use from 0.5% to 30%. Percentages are by weight, and are based upon the dry weight of the animal glue in the composition.

Animal glue compositions containing reducing sugars, with the addition of an ammonium compound, show no perceptible signs of resinification and remain in excellent condition for long periods, as will be seen from the examples.

I have further found that the resinification inhibiting effect of ammonium compounds is most pronounced within the pH range 4.0 to 6.0, although the effect is also present at other pH values. The tendency toward resinification is increased with higher pH values as well as at increased temperatures.

The animal glue compositions herein referred to need not be plasticized exclusively by reducing sugars but may contain mixtures of reducing sugars with other plasticizers such as cane sugar, glycerine and diethylene glycol.

When compositions containing reducing sugars are heated there is sometimes a certain amount of caramelization with resulting darkening. It is, therefore, desirable to include in such compositions a small amount of a reducing chemical, such as an alkali metal bisulfite or hydrosulfite which, by its bleaching action, counteracts any darkening caused by caramelization.

The following examples are given to illustrate the practice of my invention:

Example I

This example illustrates the manufacture of a flexible glue, using a corn sugar of high reducing sugar content as the plasticizer (together with glycerine or diethylene glycol), and ammonium sulphate as the resinification inhibitor.

The following ingredients are added in the order given, maintaining the temperature of the mass at 140° F. to 160° F.

| | Pounds |
|---|---|
| Water | 780 |
| Phenol | 10 |
| Animal glue (235 gram test bone glue) | 540 |
| Corn sugar (of the type known in the trade as Nabob) | 300 |
| Glycerine or diethylene glycol | 100 |
| Ammonium sulphate | 160 |
| Sodium hydrosulfite | 2 |

The above mixture is adjusted to pH 5.0, by the addition of hydrochloric acid. The mass is then poured into moulds and allowed to cool, forming flexible slabs.

If in this example the glycerine or diethylene glycol be omitted, the corn sugar proportion may be increased to 540 pounds.

Even after prolonged periods, the slabs can be re-melted easily, resulting in a satisfactory glue composition with no perceptible resinification.

It is known that resinification is ordinarily accelerated at higher temperatures. However, if a portion of the above batch be heated at 190° F., no sign of resinification will be apparent, even after approximately 50 hours.

If, in another variation of the above example, a batch be prepared using the same ingredients and relative proportions as shown above, with the exception that the ammonium sulphate be omitted, and the mass is heated at 190° F., within two to four hours the mass becomes so rubbery, tough and unworkable that it can no longer be used as an adhesive.

Example II

This example illustrates the manufacture of a flexible glue, using ordinary corn syrup (known in the trade as glucose) as the platicizer (together with cane sugar), and ammonium phosphate as the resinification inhibitor.

The following ingredients are added in the order given, maintaining the temperature of the mass at 140° F. to 160° F.

| | Pounds |
|---|---|
| Water | 260 |
| Phenol | 5 |
| Animal glue (110 gram test bone glue) | 300 |
| Glucose | 250 |
| Cane sugar | 100 |
| Ammonium phosphate | 30 |

The above mixture is adjusted to pH 5.0, by the addition of hydrochloric acid. The mass is then poured into moulds and allowed to cool, forming flexible slabs.

If in this example the cane sugar be omitted, the glucose proportion may be increased to 300 pounds.

The same accelerated resinification heating test may be performed as in Example I, without any perceptible resinification resulting.

Example III

This example illustrates the manufacture of a flexible glue using invert sugar as the plasticizer and a very small amount of ammonium acetate as the resinification inhibitor.

The following ingredients are added in the order given, maintaining the temperature of the mass at 140° F. to 160° F.

| | Pounds |
|---|---|
| Water | 260 |
| Phenol | 5 |
| Animal glue (110 gram test bone glue) | 300 |
| Invert sugar | 300 |
| Ammonium acetate | 1.5 |

The above mixture is adjusted to pH 5.0, by the addition of hydrochloric acid. The mass is then poured into moulds and allowed to cool, forming flexible slabs.

While the resinification-inhibiting effect is not as pronounced as in Example I and Example II, the product exhibits less resinification than a similar mixture made without the addition of the ammonium compound.

The phenol in the above examples functions as a preservative.

The relative strength of various animal glues is ordinarily described in terms of the gram-jelly strength scale adopted by the National Association of Glue Manufacturers, based upon measurements on the Bloom Gelometer, and it is this scale which I use in the examples, when referring to the gram strength of glues.

The specific compositions shown in the examples are merely by way of illustration of the use of resinification inhibitors in animal glue compositions. Animal glue compositions are used in countless variations for adhesive and other purposes. My invention covers the use of resinification inhibitors in animal glue compositions generally and is not limited to the specific embodiment shown in these examples. Since every manner of animal glue formulation is covered by the scope of this invention, it is obvious that specific proportions of such components as animal glues, sugar, water, and the like, need not be given here. Similarly, the specific resinification inhibitor chosen, or the proportion thereof, can vary with different glue formulations. It is sometimes advisable to use a mixture of ammonium compounds.

The product of my invention may be sold in the form indicated by the above examples, or the dry ingredients may be blended and sold as such, the consumer adding the water and any other liquid components.

I claim:

1. An animal glue composition comprising animal glue, a reducing sugar acting as a plasticizing medium and a selected ammonium compound the ammonium radical of which acts to reduce or inhibit the resinification of the glue composition, the ammonium compound being selected from the group consisting of ammonium sulphate, ammonium phosphate and ammonium acetate.

2. The animal glue composition of claim 1 in which the ammonium compound is in the proportion of from 0.5% to 30% by weight of the dry animal glue in the composition.

3. The animal glue composition of claim 1 in which the plasticizing medium consists of a reducing sugar combined with other plasticizers.

4. The method of making an animal glue composition which consists in heating animal glue and a reducing sugar to an aqueous dispersion and in mixing and reacting an ammonium compound therewith, the ammonium radical of which acts to reduce or inhibit the resinification of the glue composition, the ammonium compound being selected from the group consisting of ammonium sulphate, ammonium phosphate and ammonium acetate.

5. The method of claim 4 in which the reaction is carried out at a pH value in the range of the order of 4.0 to 6.0.

6. The method of claim 4 in which the reaction is carried out at a temperature of the order of 140° F. to 160° F. and at a pH value in the range of the order of 4.0 to 6.0.

7. The method of claim 4 in which the ammonium compound is in the proportion of from 0.5% to 30% by weight of the dry animal glue in the composition.

THOMAS AUBREY WHITE.

REFERENCES CITED

The following references are of record in the file of this patent:

UNITED STATES PATENTS

| Number | Name | Date |
|---|---|---|
| 565,361 | Link | Aug. 4, 1896 |
| 1,670,672 | Thornton | May 22, 1928 |
| 1,810,484 | Kumli | June 16, 1931 |